US011919324B2

(12) United States Patent
Yamaguchi

(10) Patent No.: US 11,919,324 B2
(45) Date of Patent: Mar. 5, 2024

(54) SOFT MEMBER ATTACHMENT STRUCTURE AND THERMOCHROMIC WRITING INSTRUMENT

(71) Applicant: Kabushiki Kaisha Pilot Corporation, Tokyo (JP)

(72) Inventor: Masaya Yamaguchi, Tokyo (JP)

(73) Assignee: Kabushiki Kaisha Pilot Corporation, Tokyo (JP)

(*) Notice: Subject to any disclaimer, the term of this patent is extended or adjusted under 35 U.S.C. 154(b) by 0 days.

(21) Appl. No.: 17/789,411

(22) PCT Filed: Dec. 24, 2020

(86) PCT No.: PCT/JP2020/048536
§ 371 (c)(1),
(2) Date: Jun. 27, 2022

(87) PCT Pub. No.: WO2021/132503
PCT Pub. Date: Jul. 1, 2021

(65) Prior Publication Data

US 2023/0047274 A1 Feb. 16, 2023

(30) Foreign Application Priority Data

Dec. 28, 2019 (JP) ................................ 2019-239963
Feb. 28, 2020 (JP) ................................ 2020-034390
(Continued)

(51) Int. Cl.
*B43L 19/00* (2006.01)
*B43K 29/02* (2006.01)

(52) U.S. Cl.
CPC .......... *B43L 19/0068* (2013.01); *B43K 29/02* (2013.01); *B43L 19/0075* (2013.01); *B43L 19/0081* (2013.01)

(58) Field of Classification Search
CPC ............ B43L 19/0068; B43L 19/0075; B43L 19/0081; B43L 19/00; B43L 19/0056; B43K 29/02; B43K 29/00; B43K 29/18
(Continued)

(56) References Cited

U.S. PATENT DOCUMENTS 7,730,578 B1 6/2010 Curren
2004/0213627 A1* 10/2004 Marschand ......... B43L 19/0087 401/198
(Continued)

FOREIGN PATENT DOCUMENTS

JP 2009214515 A 9/2009
JP 2012232484 A 11/2012
(Continued)

*Primary Examiner* — David J Walczak
(74) *Attorney, Agent, or Firm* — The Webb Law Firm

(57) ABSTRACT

A soft-member attachment structure includes an attachment hole provided through a rear end portion of a barrel. The barrel configures a thermochromic writing instrument, along a longitudinal central axis and having an inner circumferential surface between two openings located at an upper end and a lower end; an attachment portion located under a large diameter portion of a soft member used for a thermochromic change and having a diameter being smaller than a diameter of the large diameter portion and allowing insertion into the attachment hole; a straight internal hole provided along a longitudinal central axis of the soft member and opening at least at a lower end of the soft member; and a rod-like inner core having an outer diameter allowing insertion into the internal hole, a length to be placed within the internal hole, and an outer circumferential surface contacting an inner circumferential surface of the internal hole.

15 Claims, 6 Drawing Sheets

(30) Foreign Application Priority Data

| | | |
|---|---|---|
| Feb. 28, 2020 | (JP) | 2020-034391 |
| Jun. 30, 2020 | (JP) | 2020-113011 |
| Sep. 24, 2020 | (JP) | 2020-160227 |

(58) Field of Classification Search
USPC ...................... 401/52; 15/424, 427, 428, 431
See application file for complete search history.

(56) References Cited

U.S. PATENT DOCUMENTS

| | | | | |
|---|---|---|---|---|
| 2012/0308290 | A1 | 12/2012 | Ito | |
| 2014/0331448 | A1* | 11/2014 | Ohtsuka | B43L 19/0068 15/425 |
| 2021/0138826 | A1 | 5/2021 | Senga | |

FOREIGN PATENT DOCUMENTS

| | | | |
|---|---|---|---|
| JP | 2013139135 | A | 7/2013 |
| JP | 201497670 | A | 5/2014 |
| JP | 201687862 | A | 5/2016 |
| JP | 2016112896 | A | 6/2016 |
| JP | 6392298 | B2 | 9/2018 |
| JP | 2018192660 | A | 12/2018 |
| WO | 2011096357 | A1 | 8/2011 |
| WO | 2018116767 | A1 | 6/2018 |

* cited by examiner

SOFT MEMBER ATTACHMENT STRUCTURE AND THERMOCHROMIC WRITING INSTRUMENT

CROSS-REFERENCE TO RELATED APPLICATIONS

This application is the United States national phase of International Application No. PCT/JP2020/048536 filed Dec. 24, 2020, and claims priority to Japanese Patent Application Nos. 2019-239963 filed Dec. 28, 2019, 2020-034390 filed Feb. 28, 2020, 2020-034391 filed Feb. 28, 2020, 2020-113011 filed Jun. 30, 2020, and 2020-160227 filed Sep. 24, 2020, the disclosures of which are hereby incorporated by reference in their entirety.

BACKGROUND OF THE INVENTION

Field of the Invention

The present invention relates to a soft-member attachment structure for attaching a soft member to a thermochromic writing instrument, the soft member being used to cause thermochromic ink adhered to a paper surface to undergo a thermochromic change by frictional heat. The present invention also relates to a thermochromic writing instrument in which the soft member is attached to a rear end portion of a barrel or an apex of a cap by the soft-member attachment structure.

Description of Related Art

The present applicant successfully developed thermochromic ink that changes color depending on the temperature in 1975 and put the first thermochromic writing instruments containing thermochromic ink on sale in 2002. The present applicant then successfully increased the range of changes in temperature of thermochromic ink to approximately 80 degrees (−20° C. to 65° C.) in 2005 and put the thermochromic writing instruments on sale under the trade name of "FRIXION BALL®" in Europe in 2006. Currently, thermochromic writing instruments of the "FRIXION®" series manufactured and sold by the present applicant are widespread in the world.

Thermochromic ink changes color from a color to another color, from being colored to being colorless, or from being colorless to being colored by heating or cooling. Conventional thermochromic writing instruments are provided with a friction portion to cause the handwriting in the thermochromic ink written on a paper surface to undergo a thermochromic change. The friction portion is formed with an elastic material, such as rubber and an elastomer, to generate frictional heat between the friction portion and the paper surface. The frictional heat generated by abrading the handwriting in the thermochromic ink with the friction portion allows the handwriting in the thermochromic ink to undergo a thermochromic change. Conventionally, attachment structures described below as examples have been used to attach a friction portion to a thermochromic writing instrument.

WO 2011/096357 A1 discloses a structure for attaching a friction portion to a rear end of a barrel. The rear end of the barrel is provided with an attachment hole. The attachment hole has an inner circumferential surface on which an inward projection projecting inside the attachment hole is formed. Meanwhile, the friction portion is configured with a large diameter portion and a small diameter portion. The large diameter portion is used to cause the handwriting in thermochromic ink to undergo a thermochromic change. The small diameter portion is used to attach the friction portion to the rear end of the barrel. The small diameter portion has an outer circumferential surface on which an outward projection projecting outside the small diameter portion is formed. Insertion of the small diameter portion into the attachment hole causes the outward projection and the inward projection to be locked to each other. The friction portion is thus attached to the rear end of the barrel.

JP 2012-232484 A discloses a structure for attaching a friction portion that can change the hardness of the friction portion. This attachment structure is provided with an operating portion and a moving piece. The operating portion is rotatably provided at the rear end of a barrel. The moving piece is stored inside the operating portion and longitudinally moves along the central axis by rotation of the operating portion. Inside the friction portion, a cavity made of a large diameter portion and a small diameter portion is provided. Into the cavity of the friction portion, a rod-like core portion provided to the moving piece is inserted. The operating portion is rotated to change the length of the core portion inserted into the cavity of the friction portion. The friction portion can thus change the hardness.

JP 2009-214515 A discloses a structure for attaching a friction portion that allows the friction portion to be readily attached to a barrel or a cap. This attachment structure is provided with a convex portion provided to the barrel or the cap and an attachment hole penetrating the friction portion. The convex portion is inserted into the attachment hole to allow the friction portion to be readily attached to the barrel or the cap.

In addition, JP 2013-139135 A discloses, although not a structure for attaching a friction portion, a structure for attaching an eraser member that allows the eraser member to be readily attached to a barrel or a cap. This attachment structure is provided with a fitting portion and a connection portion that are provided to a barrel or a cap and is provided with a fitting hole penetrating the eraser member. The connection portion projects from an end portion of the barrel or the cap. The fitting portion is provided at the upper end of the connection portion and has a width wider than the projecting portion. The fitting hole of the eraser member has a size capable of accepting the fitting portion and the connection portion. When the fitting portion and the connection portion are inserted into the fitting hole, frictional resistance occurs between the fitting portion and the fitting hole while frictional resistance does not occur between the connection portion and the fitting hole. The eraser member can thus be readily attached to the barrel or the cap.

PRIOR ART DOCUMENTS

Patent Document

Patent Document 1: WO 2011/096357 A1
Patent Document 2: JP 2012-232484 A
Patent Document 3: JP 2009-214515 A
Patent Document 4: JP 2013-139135 A
Patent Document 5: WO 2018/116767 A1

SUMMARY OF THE INVENTION

Problems to be Solved by the Invention

Development of New Thermochromic Writing Instrument

As disclosed in WO 2018/116767 A1, the present applicant tried to commercialize a thermochromic writing instrument containing thermochromic ink in which metallic luster pigments are blended. The metallic luster pigments are configured by, for example, coating the surface of particles as core materials with metal oxide to add metallic luster to the ink color. Each particle of the metallic luster pigments blended in the thermochromic ink glitters by reflecting light to form decorative handwriting. However, such a thermochromic writing instrument containing the metallic luster pigments causes technical problems specific to thermochromic writing instruments. The plurality of problems to be solved by the currently mentioned invention are listed below.

Erasure of Metallic Luster Pigments

In the case that the thermochromic ink contained in the thermochromic writing instrument has properties to undergo a thermochromic change from being colored to being colorless by heating, a conventional friction portion is not capable of erasing the metallic luster pigments contained in the handwriting from the paper surface. That is, the conventional friction portion is capable of chemically erasing the handwriting in the thermochromic ink from the paper surface by causing the handwriting in the thermochromic ink written on the paper surface to undergo a thermochromic change from being colored to being colorless. However, the metallic luster pigments blended in the thermochromic ink are configured with particles of metal, mineral, glass, and the like, and are thus not thermochromic. For this reason, the metallic luster pigments cannot be erased from the paper surface by the frictional heat of the friction portion and remain on the paper surface. Moreover, the metallic luster pigments abraded with the friction portion scatter on the paper surface and cause the paper surface after erasing the thermochromic ink to be dirty.

Softening of Friction Portion

In such a situation, as disclosed in WO 2018/116767 A1, the present applicant invented a technique to add a viscoelastic material to the material for a friction portion and to reduce the hardness of the friction portion compared with that in the past. Such a friction portion is capable of chemically erasing the thermochromic ink by generating frictional heat and is capable of physically erasing particles of metallic luster pigments by separating the particles from a paper surface.

However, the friction portion softened by adding the viscoelastic material undergoes a large amount of deformation during abrasion of the handwriting in the thermochromic ink. That is, while the handwriting in the thermochromic ink is abraded, the apex of the friction portion is reciprocated in contact with the handwriting. Softening of the friction portion causes difficulty in movement of the apex of the friction portion to follow the reciprocation, leading to large deflection of the entire friction portion. The large deflection of the entire friction portion reduces the amount and speed of movement of the apex of the friction portion on the paper surface and inhibits generation of frictional heat. Accordingly, the friction portion softener than the past does not provide friction performance sufficient to cause the thermochromic ink to efficiently undergo a thermochromic change.

Structure for Attaching Conventional Friction Portion

In the structure for attaching a friction portion disclosed in WO 2011/096357 A1, the outward projection of the friction portion and the inward projection of the attachment hole are locked to each other to attach the friction portion to the rear end of the barrel. The friction portion is provided with an internal hole to facilitate deformation of the friction portion. The internal hole is provided to facilitate deformation of the small diameter portion of the friction portion and allow the outward projection to be readily locked to the inward projection. However, if the friction portion provided with the internal hole is softened, the friction portion is even more likely to be deformed. It is thus not possible to resist the reciprocation during the abrasion of the handwriting to maintain locking between the outward projection and the inward projection, causing the friction portion to be prone to be detached from the attachment hole.

The structure for attaching a friction portion disclosed in JP 2012-232484 A is configured to change the hardness of the friction portion by inserting the core portion provided to the moving piece into the cavity of the friction portion. However, the rod-like core portion is straight, whereas the cavity of the friction portion made of the large diameter portion and the small diameter portion similar to the friction portion. Only a tip end of the core portion is capable of contacting the inner circumferential surface in the large diameter portion of the friction portion. The areas other than the tip end of the core portion are not capable of contacting the inner circumferential surface in the large diameter portion of the friction portion. The areas other than the apex in the large diameter portion of the friction portion is thus prone to be deformed due to the cavity, and the rigidity of the friction portion sufficient to cause the thermochromic ink to efficiently undergo a thermochromic change is not obtained. If the friction portion provided with the cavity is softened, the difference in the rigidity of the apex and the areas other than the apex in the large diameter portion of the friction portion is large and it is difficult to cause the thermochromic ink to efficiently undergo a thermochromic change.

The structure for attaching a friction portion disclosed in JP 2009-214515 A is configured to insert the convex portion provided to the barrel or the cap into the attachment hole of the friction portion. However, the large diameter portion of the friction portion is prone to be deformed due to the attachment hole penetrating the center. If the friction portion penetrated by the attachment hole is softened, the large diameter portion is even more likely to be deformed, and the rigidity of the friction portion sufficient to cause the thermochromic ink to efficiently undergo a thermochromic change is not obtained. In addition, since the attachment hole opens at the apex of the friction portion, it is not possible to generate frictional heat with the apex of the friction portion.

The structure for attaching an eraser member disclosed in JP 2013-139135 A is configured to fit the fitting portion provided to the barrel or the cap to the fitting hole of the eraser member. However, same as JP 2009-214515 A described above, the eraser member is prone to be deformed due to the attachment hole penetrating the center. If the eraser member penetrated by the fitting hole is softened, the large diameter portion is even more likely to be deformed, and the rigidity of the eraser member sufficient to cause the thermochromic ink to efficiently undergo a thermochromic change is not obtained. In addition, since the fitting hole opens at the apex of the eraser member, it is not possible to generate frictional heat with the apex of the eraser member.

Wear of Friction Portion

The friction portion softened by adding a viscoelastic material is readily worn by abrading a paper surface. The friction portion disclosed in JP 2012-232484 A is provided with the cavity, causing the large diameter portion to have a thin thickness. If the friction portion provided with the cavity is softened, the apex of the friction portion turns out to be worn by use for a short time. This causes a possibility that the tip end of the core portion in contact with the apex of the friction portion is exposed to the outside and damages the paper surface.

The friction portion disclosed in JP 2009-214515 A is provided with the attachment hole penetrating the center, causing the amount of the material constituting the large diameter portion to be less by the amount for the attachment hole. Similarly, the eraser member disclosed in JP 2013-139135 A is provided with the fitting hole penetrating the center, causing the amount of the material constituting the large diameter portion to be less by the amount for the fitting hole. If the friction portion and the eraser member are softened, the large diameter portion turns out to be worn by use for a short time, causing not being capable of erasing the handwriting in the thermochromic ink.

Difficulty in Attachment Operation

The structure for attaching an eraser member disclosed in JP 2013-139135 A is configured to fit the fitting portion surrounded by a cylindrical supporting wall to the fitting hole of the eraser member. The maximum diameter of the fitting portion is greater than the minimum diameter of the fitting hole. The eraser member has an insertion portion provided with an engagement convex portion to abut on an inner circumferential surface of the supporting wall. The eraser member is attached by inserting the fitting portion into the fitting hole of the eraser member while the insertion portion of the eraser member is pressed into the cylindrical supporting wall. In this situation, the insertion portion of the eraser member is subjected to a force towards the inner circumferential surface of the supporting wall from the fitting portion and a force towards the fitting portion from the inner circumferential surface of the supporting wall. That is, in the process of pressing the insertion portion of the eraser member into the supporting wall, the fitting portion applies the force towards the inner circumferential surface of the supporting wall to the fitting hole by pressing the inner circumferential surface of the fitting hole. Meanwhile, the inner circumferential surface of the supporting wall applies the force towards the fitting portion to the insertion portion by pressing the engagement convex portion. As just described, the insertion portion of the eraser member has to be pressed into the supporting wall with a large force greater than the forces in the opposing directions applied inside and outside the insertion portion. The attachment operation of the eraser member is thus difficult, and in particular, it is difficult to attach the eraser member using an automatic assembling machine.

Object of the Present Invention

It is an object of the present invention to provide a soft-member attachment structure and a thermochromic writing instrument that are capable of a) through d) below:

a) The rigidity of a softened friction portion is improved to inhibit deformation of the friction portion, thereby causing the friction portion to exhibit good friction performance;

b) Forces in opposing directions are capable of firmly fixing inside and outside an attachment portion of the softened friction portion and attachment of the friction portion does not have to be operated with a large force;

c) Even when the softened friction portion is worn, a paper surface is not damaged; and d) It is possible to chemically and physically erase handwriting in thermochromic ink in which metallic luster pigments are blended.

Means to Solve the Problems (1) To achieve the above object, a soft-member attachment structure of the present invention for attaching a soft member to a thermochromic writing instrument, the soft member being used to cause thermochromic ink adhered to a paper surface to undergo a thermochromic change by frictional heat, the soft-member attachment structure includes: an attachment hole provided through a rear end portion of a barrel or an apex of a cap, the barrel and the cap configuring the thermochromic writing instrument, along a longitudinal central axis and having an inner circumferential surface between two openings located at an upper end and a lower end; an attachment portion located under a large diameter portion of the soft member used for a thermochromic change and having a diameter being smaller than a diameter of the large diameter portion and allowing insertion into the attachment hole; a straight internal hole provided along a longitudinal central axis of the soft member and opening at least at a lower end of the soft member; and a rod-like inner core having an outer diameter allowing insertion into the internal hole, a length to be placed within the internal hole, and an outer circumferential surface contacting an inner circumferential surface of the internal hole, wherein the attachment portion is inserted into the attachment hole and the inner core is inserted into the internal hole to configure the soft member to be attached to the attachment hole.

(2) It is preferred that, in the soft-member attachment structure according to (1) above, the attachment portion is integrally formed under the large diameter portion as a single piece using a material same as that of the soft member, the internal hole is provided with a length from the attachment portion to a position reaching the large diameter portion in the soft member, and, in a state where the attachment portion is inserted into the attachment hole and the inner core is inserted into the internal hole, the inner core is held in a position corresponding to the inner circumferential surface of the attachment hole to configure the attachment portion to be sandwiched between the outer circumferential surface of the inner core and the inner circumferential surface of the attachment hole.

(3) It is preferred that, in the soft-member attachment structure according to (2) above, in a state where the attachment portion is inserted into the attachment hole and the inner core is inserted into the internal hole, the inner core has a length from an opening at a lower end of the internal hole to beyond the opening at the upper end of the attachment hole.

(4) It is preferred that, in the soft-member attachment structure according to (2) above, in a state where the attachment portion is inserted into the attachment hole and the inner core is inserted into the internal hole, the inner core has a length from an opening at a lower end of the internal hole to the opening at the upper end of the attachment hole.

(5) It is preferred that, in the soft-member attachment structure according to (2) above, in a state where the attachment portion is inserted into the attachment hole and the inner core is inserted into the internal hole, the inner core has a length from an opening at a lower end of the internal hole to a position not reaching the opening at the upper end of the attachment hole.

(6) It is preferred that, in the soft-member attachment structure according to (4) or (5) above, in a state where the attachment portion is inserted into the attachment hole and the inner core is inserted into the internal hole, an upper end of the inner core is inserted into the internal hole to a position beyond the opening at the upper end of the attachment hole.

(7) It is preferred that, in the soft-member attachment structure according to any one of (2) through (6) above, in a state where the inner core has a maximum outer diameter substantially identical to or greater than an inner diameter of the internal hole and the inner core is inserted into the internal hole, the outer circumferential surface of the inner core and the inner circumferential surface of the internal hole pressure fit each other.

(8) It is preferred that, in the soft-member attachment structure according to (7) above, a lubricant is present between the outer circumferential surface of the inner core and the inner circumferential surface of the internal hole.

(9) It is preferred that, in the soft-member attachment structure according to any one of (1) through (8) above, in a process of inserting the inner core into the internal hole where the internal hole is a hole with one closed end opening at the lower end of the soft member and not opening at an upper end of the soft member, the inner core is provided with a vent portion to discharge air in the internal hole.

(10) It is preferred that, in the soft-member attachment structure according to (9) above, the vent portion is a through hole penetrating the inner core from an end to another end along a longitudinal central axis of the inner core.

(11) It is preferred that, in the soft-member attachment structure according to (9) above, the vent portion is at least one groove or projection continuing from an end to another end of the inner core along the outer circumferential surface of the inner core.

(12) It is preferred that, in the soft-member attachment structure according to any one of (2) through (11) above, when a lower end of the inner core is provided with a flange portion having a diameter greater than an inner diameter of the internal hole and the inner core is inserted into the internal hole, the flange portion abuts on a lower end of the attachment portion.

(13) It is preferred that, in the soft-member attachment structure according to any one of (2) through (12) above, an inward projection projecting inside the attachment hole is formed on the inner circumferential surface of the attachment hole, an outward projection projecting outside the attachment portion is formed on an outer circumferential surface of the attachment portion, when the attachment portion is inserted into the attachment hole, the outward projection rides over the inward projection to lock the outward projection and the inward projection to each other, and the inner core is held in a position corresponding to the inner circumferential surface of the attachment hole to sandwich the attachment portion between the outer circumferential surface of the inner core and the outward projection of the attachment hole.

(14) To achieve the above object, a thermochromic writing instrument of the present invention includes the soft-member attachment structure according to any one of (1) through (13) above, wherein the soft member is attached to the rear end portion of the barrel or the apex of the cap by the soft-member attachment structure.

In the soft-member attachment structure of the present invention, the term "upper" regarding the attachment hole means the direction of the rear end portion of the barrel or the direction of the apex of the cap, and the term "lower" regarding the attachment hole means the direction opposite to those directions. Meanwhile, the term "upper" regarding the soft member means the direction of the large diameter portion, and the term "lower" regarding the soft member means the direction of the attachment portion.

Effects of the Invention

The soft-member attachment structure and the thermochromic writing instrument of the present invention exhibit the following effects from a) to d):

a) The rigidity of the softened friction portion is improved to inhibit deformation of the friction portion, thereby causing the friction portion to exhibit good friction performance;

b) The forces in opposing directions are capable of firmly fixing inside and outside the attachment portion of the softened friction portion and the attachment of the friction portion does not have to be operated with a large force;

c) Even when the softened friction portion is worn, the paper surface is not damaged; and d) It is possible to chemically and physically erase the handwriting in the thermochromic ink in which the metallic luster pigments are blended.

DESCRIPTION OF THE INVENTION

A soft-member attachment structure and a thermochromic writing instrument according to embodiments of the present invention are described below with reference to the drawings.

1. Overview

A soft-member attachment structure in the present embodiment is provided to attach a soft member to a thermochromic writing instrument, the soft member being used to cause thermochromic ink adhered to a paper surface to undergo a thermochromic change by frictional heat. FIGS. 1 through 9 do not illustrate the entire thermochromic writing instrument but illustrate only a rear end portion of a barrel configuring the thermochromic writing instrument.

Figure 1:
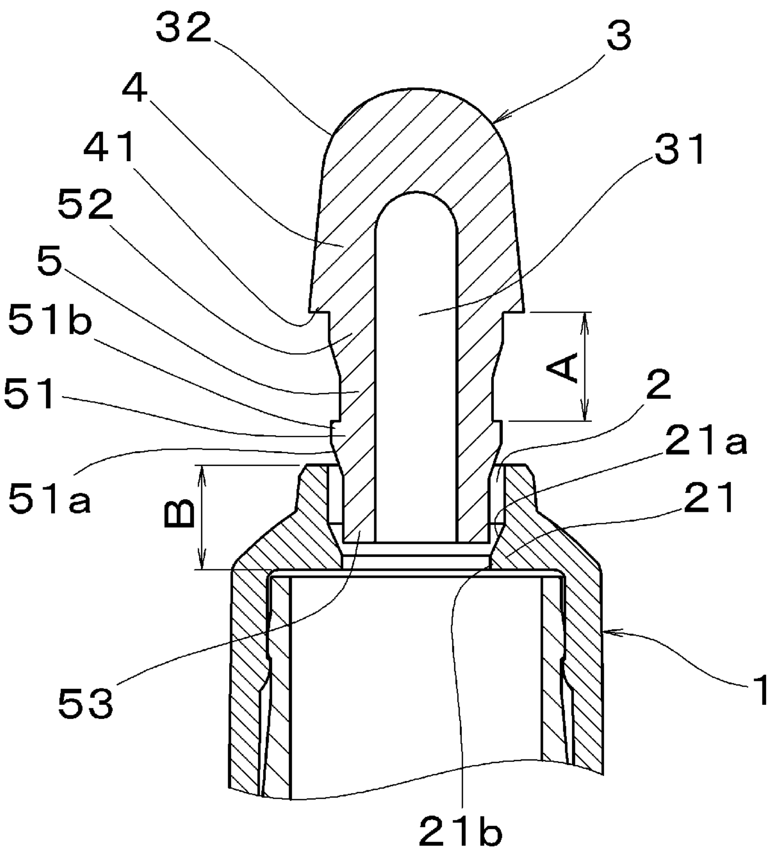
FIG. 1 is a cross-sectional view illustrating a soft member and an attachment hole provided at a rear end portion of a barrel, the soft member and the attachment hole configuring a soft-member attachment structure according to an embodiment of the present invention, and illustrating a state before an attachment portion of the soft member is inserted into the attachment hole.
Figure 2:
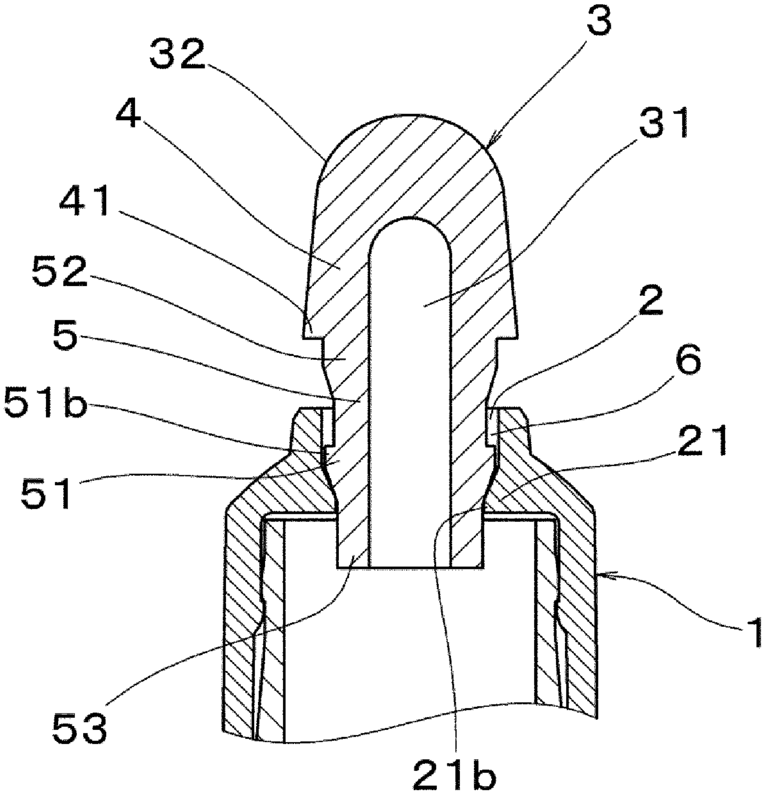
FIG. 2 is a cross-sectional view illustrating a provisional insertion state in the process of inserting the attachment portion of the soft member into the attachment hole.
Figure 3:
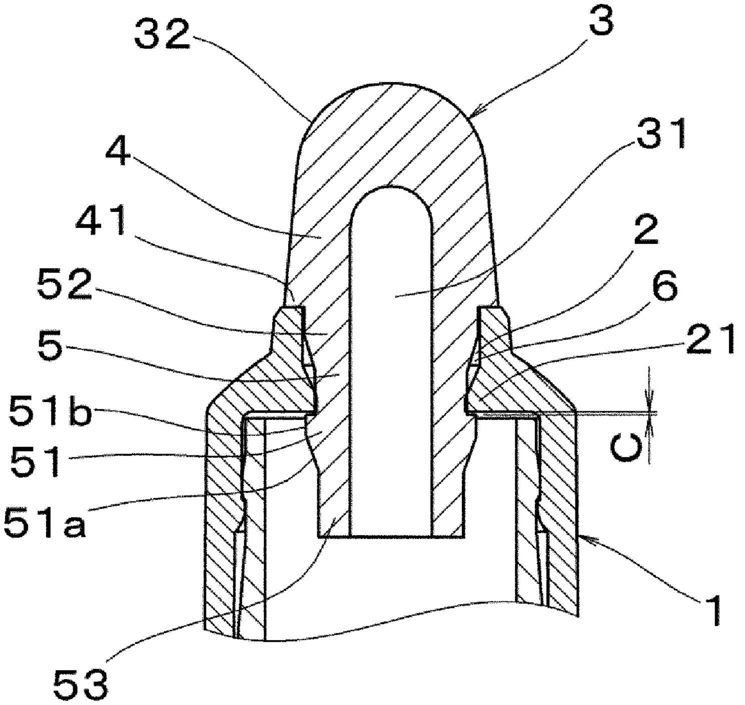
FIG. 3 is a cross-sectional view illustrating a state where insertion of the soft member into the attachment hole is completed.
Figure 4:
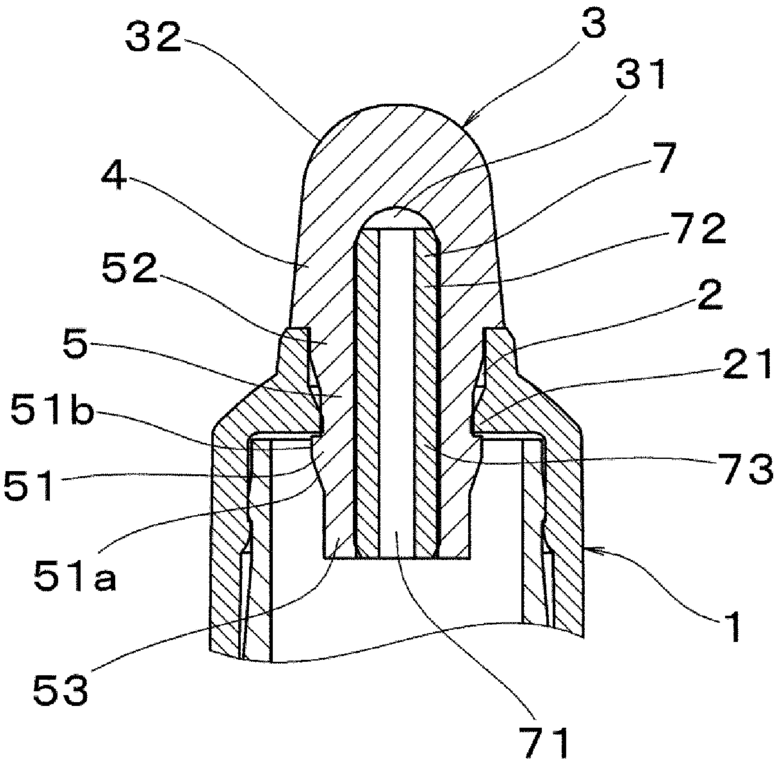
FIG. 4 is a cross-sectional view illustrating a soft-member attachment structure according to an embodiment of the present invention and illustrating a state where an inner core according to the first embodiment is inserted into an internal hole of the soft member in FIG. 3.

The soft-member attachment structure in the present embodiment is mainly configured with an attachment hole 2, an attachment portion 5, and an internal hole 31 illustrated in FIGS. 1 through 3 and an inner core 7 illustrated in FIGS. 4 through 9. The attachment hole 2 is provided at the rear end portion of a barrel 1. The attachment portion 5 is integrally formed under a large diameter portion 4 of a soft member 3 as a single piece. The internal hole 31 is provided from the attachment portion 5 to a position reaching the center of the large diameter portion 4 in the soft member 3. The inner core 7 is one component independent of the barrel 1 and the soft member 3. As illustrated in FIGS. 3 and 4, the inner core 7 is inserted into the internal hole 31 of the soft member 3 in a state where the attachment portion 5 of the soft member 3 is fully inserted into the attachment hole 2 of the barrel 1. The structure for attaching the soft member 3 is detailed below.

2. Attachment Hole

As illustrated in FIG. 1, the attachment hole 2 is provided at the rear end portion of the barrel 1. The attachment hole 2 penetrates the rear end portion of the barrel 1 along the longitudinal central axis. The attachment hole 2 has an inner circumferential surface between two openings located at the upper end and the lower end. In a lower part of the inner circumferential surface of the attachment hole 2, an annular inward projection 21 is formed. The inward projection 21 has an outer circumferential surface on which a guide surface 21*a* is formed as a tapered surface in an inverted conical shape. The guide surface 21*a* has a diameter gradually decreasing downward from the upper part. The guide surface 21*a* has a lower end continuing to a vertical outer circumferential surface of a minimum inner diameter portion 21*b*, which is an opening at the lower end of the attachment hole 2. The attachment hole 2 thus configured has lateral cross sections in circular shapes with different diameters.

The barrel 1 is produced by injection molding a synthetic resin (e.g., polypropylene). The attachment hole 2 and the inward projection 21 are integrally formed as a single piece at the rear end portion of the barrel 1 by injection molding. It should be noted that the attachment hole 2 may be provided at, for example, the apex of a cap configuring the thermochromic writing instrument not limited to the rear end portion of the barrel 1.

3. Soft Member

As illustrated in FIG. 1, the soft member 3 in the present embodiment is configured by integrally forming the attachment portion (small diameter portion) 5 with a diameter smaller than that of the large diameter portion 4 as a single piece under the large diameter portion 4 in a bullet shape. The large diameter portion 4 is an area functioning as a friction portion 32 of the thermochromic writing instrument and is used to cause thermochromic ink adhered to a paper surface to undergo a thermochromic change by frictional heat. Moreover, the large diameter portion 4 in the present embodiment has a function of adsorbing and separating metallic luster pigments blended in the thermochromic ink from the paper surface. The attachment portion 5 is used to attach the soft member 3 to the attachment hole 2 of the barrel 1.

3.1 Large Diameter Portion (Friction Portion)

The large diameter portion 4 has an outer circumferential surface that is a convex curved surface capable of contacting the paper surface at various tilt angles. The large diameter portion 4 has a diameter at the lower end greater than the diameter of the opening at the upper end of the attachment hole 2 and preferably smaller than the diameter on the rear end surface of the barrel 1. At the boundary between the large diameter portion 4 and the attachment portion 5, an annular surface 41 abutting on the rear end surface of the barrel 1 is formed. When the attachment portion 5 is attached to the attachment hole 2, the large diameter portion 4 projects above the rear end surface of the barrel 1.

3.2 Attachment Portion

The attachment portion 5 includes a tubular wall portion and has a diameter being smaller than the diameter at the lower end of the large diameter portion 4 and allowing insertion into the attachment hole 2. At the center of an outer circumferential surface of the attachment portion 5, an annular outward projection 51 is formed. Above the outward projection 51 on the outer circumferential surface of the attachment portion 5, an annular bulged portion 52 is formed. In the attachment portion 5, a cylindrical portion 53 is provided under the outward projection 51.

The outward projection 51 has an outer circumferential surface on which a guide surface 51*a* is formed as a tapered surface in an inverted conical shape. The guide surface 51*a* has a diameter gradually increasing upward from the lower part. The guide surface 51*a* has an upper end continuing to a vertical outer circumferential surface of a maximum outer diameter portion 51*b* of the outward projection 51. The vertical outer circumferential surface of the maximum outer diameter portion 51*b* has an upper end continuing to a horizontal annular upper end surface.

The maximum outer diameter portion 51*b* of the outward projection 51 has a diameter greater than the diameter of the minimum inner diameter portion 21*b* in the inward projection 21 of the attachment hole 2 described above and smaller than the diameter of the opening at the upper end of the attachment hole 2. For example, the difference in dimensions between the maximum outer diameter portion 51*b* and the minimum inner diameter portion 21*b* is ranged from 0.5 mm to 2.0 mm and preferably ranged from 0.5 mm to 1.0 mm. The difference in dimensions thus configured allows, in the process of inserting the attachment portion 5 into the attachment hole 2, smooth passage of the outward projection 51 through the inward projection 21 to readily lock the outward projection 51 to the inward projection 21 (refer to FIGS. 2 and 3).

The bulged portion 52 contacts the inner circumferential surface of the opening at the upper end of the attachment hole 2 when the attachment portion 5 is fully inserted into the attachment hole 2 (refer to FIG. 3). This allows suppression of radial wobble of the soft member 3. The bulged portion 52 has a diameter substantially identical to the diameter of the opening at the upper end of the attachment hole 2. The diameter of the bulged portion 52 is smaller than the diameter at the lower end of the large diameter portion 4 and greater than the diameter of the maximum outer diameter portion 51*b* of the outward projection 51.

The cylindrical portion 53 has a diameter smaller than the diameter of the minimum inner diameter portion 21*b* of the inward projection 21 of the attachment hole 2 described above. The cylindrical portion 53 is provided to cause the attachment portion 5 to be in the provisional insertion state to the attachment hole 2. The provisional insertion state is illustrated in FIG. 2. The cylindrical portion 53 thus configured facilitates the operation for attaching the soft member 3. That is, the soft member 3 is dropped into the attachment hole 2 to be in the provisional insertion state illustrated in FIG. 2. The soft member 3 is then pressed into the attachment hole 2 to fully insert the attachment portion 5 into the attachment hole 2 and simultaneously lock the outward projection 51 to the inward projection 21 (refer to FIG. 3). It should be noted that the outer circumferential surface under the outward projection 51 in the attachment portion 5 is not limited to the circumferential surface of the cylindrical portion 53 and may be, for example, a tapered surface in an inverted conical shape.

3.3 Formation of Annular Space

An intermediate portion (area between the bulged portion 52 and the outward projection 51) of the attachment portion 5 has an outer diameter is smaller than the inner diameter around the entrance of the attachment hole 2 (area above the inward projection 21). In the provisional insertion state illustrated in FIG. 2, an annular space 6 is thus formed between the attachment portion 5 and the attachment hole 2. The annular space 6 prevents the intermediate portion of the attachment portion 5 from pressure fitting the inner circumferential surface around the entrance of the attachment hole 2. That is, after the provisional insertion state illustrated in FIG. 2, the outward projection 51 of the attachment portion 5 rides over the inward projection 21 of the attachment hole 2. In this situation, the outward projection 51 is firmly pressure fitted to the inward projection 21, causing the intermediate portion of the attachment portion 5 to be elastically deformed and bulge radially outside. If the intermediate portion of the attachment portion 5 pressure fits the inner circumferential surface around the entrance of the attachment hole 2, frictional resistance turns out to occur that inhibits insertion of the attachment portion 5. The annular space 6 stores the intermediate portion of the attachment portion 5 bulging radially outside to prevent the intermediate portion of the attachment portion 5 from pressure fitting the inner circumferential surface around the entrance of the attachment hole 2.

3.4 Axial Clearance

As illustrated in FIG. 1, a length A from the upper end of the attachment portion 5 to the upper end of the outward projection 51 is slightly larger than a length B from the upper end of the attachment hole 2 to the lower end of the inward projection 21. This causes the entire outward projection 51 to securely pass through the inward projection 21. That is, if the lengths A and B are identical, there is a possibility that the frictional resistance to occur between the outward projection 51 and the inward projection 21 causes the upper end surface of the maximum outer diameter portion 51*b* of the outward projection 51 not to be capable of passing through the inward projection 21. The length A of the attachment portion 5 slightly larger than the length B of the attachment hole 2 allows the entire outward projection 51 to pass through the inward projection 21 even after the annular surface 41 of the large diameter portion 4 abuts on the rear end of the barrel 1. This allows the entire outward projection 51 to securely pass through the inward projection 21 even if frictional resistance occurs between the outward projection 51 and the inward projection 21. The difference in the dimensions of the lengths A and B appears as a clearance C, illustrated in FIG. 3, between the outward projection 51 and the inward projection 21. The clearance C is preferably ranged from 0.05 mm to 1.0 mm and more preferably from 0.1 mm to 0.5 mm. The slight clearance C thus configured does not cause movement of the soft member 3 in the direction of the central axis and loosening of the locking between the outward projection 51 and the inward projection 21.

3.5 Internal Hole

Inside the soft member 3, the internal hole 31 is provided. The internal hole 31 is a straight hole provided along the central axis of the soft member 3 and opens at least at the lower end of the soft member 3. The internal hole 31 in the present embodiment is a hole with one closed end, the hole reaching the center of the large diameter portion 4 from the lower end of the attachment portion 5 and not opening at the upper end of the soft member 3. The internal hole 31 is provided from the lower end of the attachment portion 5 to a position reaching at least the upper end of the outward projection 51. The internal hole 31 thus configured facilitates deformation of the outward projection 51 radially inside. It is this possible to readily lock the outward projection 51 to the inward projection 21. Moreover, the internal hole 31 is subjected to insertion of the inner core 7 described later.

3.6 Hardness and Viscosity of Soft Member

The material constituting the soft member 3 is preferably an elastic synthetic resin (rubber, elastomer) and examples include silicone resins, SBS resins (styrene-butadiene-styrene copolymers), SEBS resins (styrene-ethylene-butylene-styrene copolymers), fluorine-based resins, chloroprene resins, nitrile resins, polyester-based resins, ethylene-propylene-diene rubber (EPDM), and the like.

The soft member 3 in the present embodiment has a hardness less than that of a conventional friction portion to physically erase the metallic luster pigments blended in the thermochromic ink described later from the paper surface. The soft member 3 with the lower hardness is capable of entering indentation of the handwriting formed on the paper surface.

The hardness of the soft member 3 is expressed by, for example, a Shore A hardness measured in accordance with "Testing Methods for Durometer Hardness of Plastics" defined in JIS K 7215-1986 of Japan Industrial Standard. The durometer used for measuring the Shore A hardness is provided with an indenter biased by a spring and indicates the amount of indentation of the indenter against a measured object as a Shore A hardness. A smaller Shore A hardness indicates that the measured object is softer, and a larger Shore A hardness indicates that the measured object is harder.

The Shore A hardness of the soft member 3 measured by the testing method in accordance with JIS K 7215-1986 preferably satisfies the following conditions i) and ii):

i) The Shore A hardness immediately after starting contact with the indenter is 60 or more and 85 or less; and ii) The value ΔHS defined by the following equation is 0 or more and less than 5.

$$\Delta HS = (\text{Shore } A \text{ Hardness immediately after Starting Contact with Indenter}) - (\text{Shore } A \text{ Hardness 15 seconds after Starting Contact with Indenter})$$

It should be noted that "immediately after starting contact with the indenter" in i) and ii) above means a time within 1 second after contacting the measured object with the indenter.

The Shore A hardness immediately after starting contact with the indenter in i) above is preferably 60 or more and 80 or less and more preferably 65 or more and 75 or less. The conditions i) and ii) above may be satisfied by adding a viscoelastic material to the material constituting the soft member 3. For example, a polymeric material, such as a rubber component, a resin component, and an elastomeric component, may be added as the viscoelastic material. In particular, preferred polymeric materials contain, as a main component, a highly viscous α-olefin based copolymer composition obtained by adding paraffinic oil to an α-olefin based copolymer. Specifically, such a polymeric material contains a highly viscous α-olefin based copolymer composition as a main component and is appropriately subjected to melt mixing of a polystyrene-based elastomer and an olefinic elastomer as elastic materials and moreover crystalline polyolefin, which is less elastic. The ratio of mixing these materials is selected considering the efficiency of frictional heat generation, the capability of separating the metallic luster pigments, and the processability of the soft member.

Satisfaction of the Shore A hardness in i) above increases the efficiency of frictional heat generation of the soft member 3. The soft member 3 is thus capable of causing the handwriting in the thermochromic ink to readily undergo a thermochromic change. In addition, the soft member 3 satisfying the Shore A hardness in i) above is softer than a conventional friction portion and is capable of entering the indentation of the handwriting formed on the paper surface. Further, the soft member 3 satisfying ΔHS in ii) above allows the metallic luster pigments to be adsorbed and separated from the indentation of the handwriting.

The value ΔHS in ii) above indicates the relaxation time for stress relaxation (temporal change in stress) when a certain strain is applied to the soft member 3. The relaxation time for stress relaxation is an indicator for classification of the material into an elastic material, a viscoelastic material, or a viscous material. The soft member 3 satisfying the value ΔHS in ii) above is considered as an elastic material provided with suitable viscosity for allowing adsorption of the metallic luster pigments. Meanwhile, the material with the value ΔHS of 5 or more is considered as a viscoelastic material or a viscous material. If the soft member 3 is a viscoelastic material or a viscous material, the amount of deformation during abrasion of the handwriting in the thermochromic ink is too large and sufficient friction performance is not obtained. Accordingly, the value ΔHS of the soft member 3 is preferably 0 or more and less than 5.

It should be noted that the Shore A hardness in i) and ii) above may be a Shore A hardness converted from a Shore D hardness of the soft member 3 measured by a testing method in accordance with JIS K 7215-1986.

3.7 Amount of Wear of Soft Member

In order to physically erase the metallic luster pigments blended in the thermochromic ink from the paper surface, the soft member 3 is preferably scraped by friction on the paper surface and preferably generates a small amount of wear crumbs (eraser crumbs). The soft member 3 wears itself while adhering the metallic luster pigments to the wear crumbs and enclosing them, thereby removing the metallic luster pigments from the paper surface.

The amount of wear of the soft member 3 is expressed by, for example, tensile strength Tb at break and elongation Eb at break calculated in accordance with "Rubber, vulcanized or thermoplastic—Determination of tensile stress-strain properties" defined in JIS K 6251: 2017 of Japan Industrial Standard. The tensile strength Tb at break is a value obtained by dividing the tensile force recorded when the measured object is broken by the cross section of the measured object before testing. The elongation Eb at break is an elongation when the measured object is broken and expressed in a percentage (%) based on the length of the measured object before testing.

The present inventor has found that the amount of wear of the soft member 3 is inversely proportional to the value Tb×Eb. That is, the amount of wear of the soft member 3 is influenced by the mechanical strength and the elongation percentage of the material. Appropriate combination of the values of the tensile strength Tb at break and the elongation Eb at break allows control of the amount of wear of the soft member 3. The value Tb×Eb represents the amount of energy for wearing the soft member 3. Accordingly, the value Tb×Eb is smaller when the measured object is more prone to be worn, and the value is larger when the measured object is less likely to be worn.

The value Tb×Eb of the soft member 3 calculated by the method in accordance with JIS K 6251: 2017 preferably satisfies the following condition iii).

iii) 5,000≤Tb×Eb≤18,000 It should be noted that, in iii) above, the unit of the tensile strength Tb at break is "MPa" and the unit of the elongation Eb at break is "%" while they may be converted to other units.

In iii) above, it is preferred that 8,000≤Tb×Eb≤16,000 and more preferred that 10,000≤Tb×Eb≤14,000. The soft member 3 satisfying the condition iii) above generates a moderate amount of wear crumbs by normal friction operation with human hand. This allows the metallic luster pigments blended in the thermochromic ink to be adhered to the wear crumbs to be enclosed in the crumbs.

In iii) above, if the value Tb×Eb is more than 18,000, it is difficult to wear the soft member 3 by normal friction operation with human hand. Thus, it is not possible to wear the soft member 3 while adhering the metallic luster pigments to the wear crumbs and enclosing them.

Meanwhile, in iii) above, if the value Tb×Eb is less than 5,000, the soft member 3 turns out to be readily scraped by normal friction operation with human hand. This causes loss of the frictional heat generated with the soft member 3 together with the wear crumbs and it is thus difficult to cause the thermochromic ink to efficiently undergo a thermochromic change.

4. Inner Core

The inner core 7 is formed with a synthetic resin harder than the soft member 3 or metal. The material constituting the inner core 7 will be described later. The inner core 7 is inserted into the internal hole 31 of the soft member 3 thus configured to allow improvement in the rigidity of the soft member 3 and inhibition of deformation of the soft member 3. It is thus possible to exhibit good friction performance even when the hardness of the soft member 3 is reduced.

The inner core 7 in the first embodiment illustrated in FIG. 4 has a length from the opening at the lower end of the internal hole 31 to a position reaching the center of the large diameter portion 4. The inner core 7 with such a length is inserted into the internal hole 31 to allow improvement in the rigidity of both the large diameter portion 4 and the attachment portion 5 and inhibition of deformation by friction operation.

The inner core 7 is a small columnar component with an outer diameter substantially identical to the inner diameter of the internal hole 31. The columnar inner core 7 has an outer circumferential surface contacting an inner circumferential surface of the internal hole 31 along the entire length. The inner core 7 is preferably configured to have an outer diameter greater than the inner diameter of the internal hole 31 and have an outer circumferential surface pressure fitting the inner circumferential surface of the internal hole 31 along the entire length. In the present embodiment, the upper half of the inner core 7 is referred to as an upper core portion 72 and the lower half of the inner core 7 is referred to as a lower core portion 73.

4.1 Upper Core Portion

The upper core portion 72 contacts or pressure fits inside the large diameter portion 4 to improve the rigidity of the large diameter portion 4. The upper core portion 72 inhibits deformation of the large diameter portion 4 by friction operation. In particular, when the soft member 3 has a Shore A hardness of more than 85 or a ΔHS value of 5 or more, the upper core portion 72 exhibits an inhibiting effect effective for deformation of the entire large diameter portion 4. That is, the large diameter portion 4 in the present embodiment has an outer circumferential surface that is a convex curved surface and is capable of contacting the paper surface at various tilt angles. Regardless of which area of the large diameter portion 4 among the apex, near the apex, and the side abrading the paper surface, the upper core portion 72 inhibits deformation of the large diameter portion 4 to allow generation of the frictional heat for a thermochromic change. It should be noted that, in the case that the large diameter portion 4 has rigidity not to cause deformation by friction operation, the entire length of the soft member 3 may be reduced to configure the upper core portion 72 not to contact inside the large diameter portion 4 (refer to FIG. 5).

4.2 Lower Core Portion

The lower core portion 73 contacts or pressure fits inside the attachment portion 5 to improve the rigidity of the attachment portion 5. The lower core portion 73 exhibits the following two important mechanical effects on attachment of the soft member 3 to the rear end portion of the barrel 1.

Firstly, the lower core portion 73 inhibits inward deformation of the attachment portion 5 to prevent detaching the locking between the outward projection 51 and the inward projection 21. That is, the soft member 3 in the present embodiment is provided with the internal hole 31 and has the low hardness, causing the entire piece to be readily deformed. In particular, the attachment portion 5 is in a tubular shape with a small thickness and is thus prone to be deformed inside by friction operation. The lower core portion 73 contacts or pressure fits inside the attachment portion 5 to inhibit inward deformation of the attachment portion 5. This causes the locking between the outward projection 51 and the inward projection 21 not to be detached by friction operation.

Secondly, the lower core portion 73 presses the attachment portion 5 outward to cause the locking between the outward projection 51 and the inward projection 21 to be firm. That is, the lower core portion 73 contacts or pressure fits inside the attachment portion 5 to press the entire attachment portion 5 outward. The pressing force of the lower core portion 73 biases the outward projection 51 of the attachment portion 5 outward. Meanwhile, the inward projection 21 of the attachment hole 2 is subjected to the pressing force of the lower core portion 73 to generate a reaction force and press the attachment portion 5 inward. The above-described forces in the directions inside and outside cause the outward projection 51 and the inward projection 21 to be locked more firmly.

4.3 Vent Portion

The internal hole 31 in the present embodiment is a hole with one closed end, the hole opening at the lower end of the soft member 3 and not opening at the upper end of the soft member 3. Meanwhile, the inner core 7 is a small columnar component with an outer diameter not less than the inner diameter of the internal hole 31. When the inner core 7 thus configured is inserted into the internal hole 31 with one closed end, air in the internal hole 31 is compressed by the inner core 7 and the inner core 7 sometimes cannot be smoothly inserted into the internal hole 31. To cope with such a situation, the inner core 7 is provided with a vent portion 71. The vent portion 71 in the present embodiment is a through hole penetrating the inner core 7 from an end to the other end along the longitudinal central axis of the inner core 7. In the process of inserting the inner core 7 into the internal hole 31, the air in the internal hole 31 passes through the vent portion 71 to be discharged outside. The vent portion 71 thus configured facilitates operation for inserting the inner core 7 into the internal hole 31 and allows an automatic assembling machine to perform the operation for inserting the inner core 7.

It should be noted that the vent portion 71 is not limited to the configuration illustrated in FIG. 4. For example, the cross-sectional shape of the vent portion 71 is not limited to a circular shape and may be in a shape other than a circle. In addition, the vent portion 71 may be provided in a position shifted from the central axis of the inner core 7. Moreover, the vent portion 71 is not limited to the through hole and may be, for example, at least one groove or projection provided on the outer circumferential surface of the inner core 7. The groove or the projection as the vent portion 71 may have a linear shape or a shape other than the linear shape. For example, the vent portion 71 may be four grooves or four projections provided in the positions of 0°, 90°, 180°, and 270° on the outer circumferential surface of the columnar inner core 7. As another example, the vent portion 71 may be a spiral groove or projection provided along the outer circumferential surface of the inner core 7. The spiral groove or projection exhibits an anti-slip effect to prevent the inner core 7 from slipping out of the internal hole 31. Moreover, instead of providing the inner core 7 with the vent portion 71, the groove or projection described above may be provided on the inner circumferential surface of the internal hole 31.

4.4 Shape of Inner Core

As illustrated in FIG. 4, the inner core 7 preferably has a vertically symmetrical shape about the laterally central axis. The inner core 7 in the vertically symmetrical shape eliminates the difference between the top and the bottom of the inner core 7 and allows insertion into the internal hole 31 of the inner core 7 from either the top or the bottom.

In contrast, the inner core 7 may have a vertically asymmetrical shape. For example, the inner core 7 may be chamfered at least in an edge portion at the upper end to facilitate insertion into the internal hole 31. The upper core portion 72 may be thinner and the lower core portion 73 may be thicker. For example, the upper core portion 72 has an outer diameter substantially identical to the inner diameter of the internal hole 31. Meanwhile, the lower core portion 73 has an outer diameter greater than the inner diameter of the internal hole 31 to cause an outer circumferential surface of the lower core portion 73 to pressure fit the inner circumferential surface of the internal hole 31. In such a configuration, the thin upper core portion 72 allows the inner core 7 to be readily inserted into the internal hole 31. In addition, the thick lower core portion 73 allows the outward projection 51 and the inward projection 21 to be firmly locked.

4.5 Holding of Inner Core

To prevent the inner core 7 inserted into the internal hole 31 from readily slipping out, the inner core 7 may be provided with an anti-slip structure on the outer circumferential surface. As the anti-slip structure, for example, the outer circumferential surface of the inner core 7 may be treated as a rough surface to increase the frictional resistance against the inner circumferential surface of the internal hole 31. As another example of the anti-slip structure, a small projection may be provided on the outer circumferential surface of the inner core 7. Moreover, the outer diameter of the inner core 7 may be markedly larger than the inner diameter of the internal hole 31 to prevent the inner core 7 from readily slipping out of the internal hole 31.

4.6 Material for Inner Core

The inner core 7 is formed with a synthetic resin harder than the soft member 3 or metal. Examples of the synthetic resin allowed to be used include polypropylene, polyethylene, polystyrene, polycarbonate, polyethylene terephthalate, polyacetal, acryl, nylon, acrylonitrile-styrene copolymer resins (AS resins), acrylonitrile-butadiene-styrene copolymer resins (ABS resins), and the like. As the synthetic resin, rubber or an elastomer harder than the soft member 3 may be used. Examples of the rubber or the elastomer allowed to be used include silicone resins, SBS resins (styrene-butadiene-styrene copolymers), SEBS resins (styrene-ethylene-butylene-styrene copolymers), fluorine-based resins, chloroprene resins, nitrile resins, polyester-based resins, and ethylene-propylene-diene rubber (EPDM). Moreover, examples of the metal allowed to be used include aluminum alloy, stainless steel, brass, and the like. The inner core 7 made of such a synthetic resin may be produced by, for example, machining, injection molding, or the like. Meanwhile, the inner core 7 made of such a metal may be produced by, for example, machining, plastic processing, or the like.

5. Method of Attaching Soft Member

With reference to FIGS. 1 through 4, a method of attaching the soft member 3 according to the present embodiment will then be described.

As illustrated in FIG. 1, the soft member 3 is arranged above the attachment hole 2 at the rear end portion of the barrel 1 and then directly dropped into the attachment hole 2. Then, as illustrated in FIG. 2, the cylindrical portion 53 of the attachment portion 5 enters the minimum inner diameter portion 21*b* of the attachment hole 2 to cause the attachment portion 5 to be in the provisional insertion state to the attachment hole 2. In this situation, the guide surface 51*a* of the attachment portion 5 abuts on the guide surface 21*a* of the attachment hole 2 to stably keep the provisional insertion state of the attachment portion 5.

The soft member 3 in the provisional insertion state is then pressed into the attachment hole 2. During this operation, the outward projection 51 of the attachment portion 5 rides over the inward projection 21 of the attachment hole 2. In this situation, the outward projection 51 is firmly pressure fitted to the inward projection 21, causing elastic deformation of the intermediate portion of the attachment portion 5 to bulge radially outside. The intermediate portion of the attachment portion 5 bulging radially outside is stored in the annular space 6 of the attachment hole 2. The intermediate portion of the attachment portion 5 thus does not pressure fit the inner circumferential surface around the entrance of the attachment hole 2 and does not inhibit insertion of the attachment portion 5. Accordingly, the outward projection 51 smoothly passes through the inward projection 21 to lock the outward projection 51 to the inward projection 21. The insertion of the attachment portion 5 into the attachment hole 2 is thus completed (refer to FIG. 3).

As illustrated in FIG. 4, the inner core 7 is then inserted into the internal hole 31 of the soft member 3. In the process of inserting the inner core 7 into the internal hole 31, the air in the internal hole 31 is discharged outside passing through the vent portion 71. The vent portion 71 thus configured allows the inner core 7 to be readily inserted into the internal hole 31. The inner core 7 inserted into the internal hole 31 presses the attachment portion 5 outward to cause the locking between the outward projection 51 and the inward projection 21 to be firm. The attachment of the soft member 3 to the rear end portion of the barrel 1 is thus completed.

Such a method of attaching the soft member 3 in the present embodiment allows insertion of the flexible attachment portion 5 into the attachment hole 2, before inserting the inner core 7 into the internal hole 31, to readily lock the outward projection 51 to the inward projection 21. The inner core 7 is then inserted into the internal hole 31, causing the forces in the directions inside and outside to act on the attachment portion 5 and the locking between the outward projection 51 and the inward projection 21 to be firmly maintained. In addition, the inner core 7 is inserted into the internal hole 31 after inserting the attachment portion 5 into the attachment hole 2 and thus the attachment of the soft member 3 illustrated in FIGS. 1 through 4 does not have to be operated with a large force.

6. Inner Core According to Second Embodiment

Figure 5:
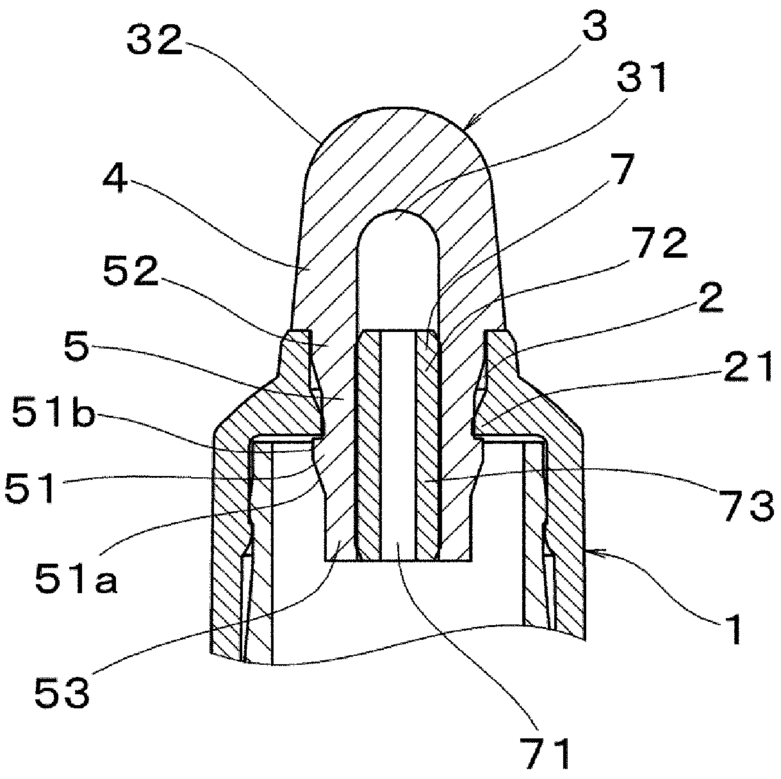
FIG. 5 is a cross-sectional view illustrating a soft-member attachment structure according to an embodiment of the present invention and illustrating a state where an inner core according to the second embodiment is inserted into the internal hole of the soft member in FIG. 3.

With reference to FIG. 5, an inner core 7 according to the second embodiment will then be described. FIG. 5 illustrates a state where the attachment portion 5 is inserted into the attachment hole 2 at the rear end portion of the barrel 1 and the inner core 7 in the present embodiment is inserted into the internal hole 31. In FIG. 5, the configuration other than the inner core 7 is identical to that in FIG. 4.

As illustrated in FIG. 5, the inner core 7 according to the second embodiment has a length from the opening at the lower end of the internal hole 31 to the opening at the upper end of the attachment hole 2. The upper end of the inner core 7 inserted into the internal hole 31 does not extend beyond the opening at the upper end of the attachment hole 2 and does not reach inside the large diameter portion 4. In other words, the inner core 7 is held in the position corresponding to the inner circumferential surface of the attachment hole 2 and does not contact inside the large diameter portion 4 at all.

Even when the soft member 3 has a Shore A hardness satisfying the conditions i) and ii) above, an increase in the thickness of the apex, near the apex, and the side of the large diameter portion 4 allows the rigidity of the large diameter portion 4 to be increased. When the large diameter portion 4 has rigidity not to cause deformation by friction operation, it is possible to reduce the entire length of the inner core 7.

The inner core 7 in the second embodiment allows firm fixation of the attachment portion 5 to the attachment hole 2. Moreover, even when the soft member 3 is worn, the paper surface is not damaged. That is, the soft member 3 in the present embodiment satisfies the condition on the amount of wear in iii) above and the large diameter portion 4 is worn by use. Even when the large diameter portion 4 is worn, the upper end of the inner core 7 does not project above the opening at the upper end of the attachment hole 2. Thus, even when the large diameter portion 4 is worn, the paper surface is not damaged by the upper end of the inner core 7.

7. Lubricant

Figure 6:
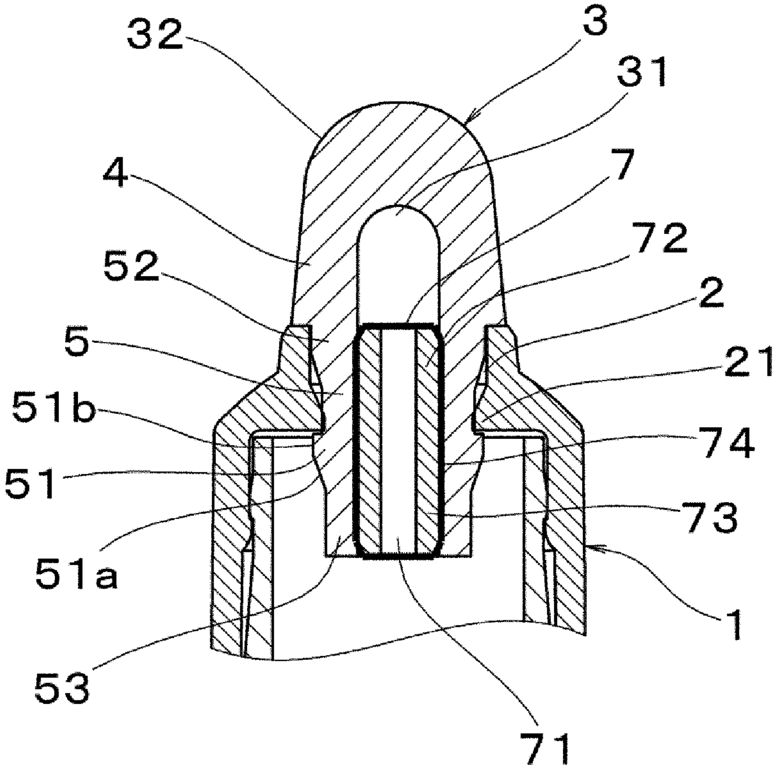
FIG. 6 is a cross-sectional view illustrating a state where a lubricant is present between the internal hole of the soft member and the inner core in FIG. 5.
Figure 7:
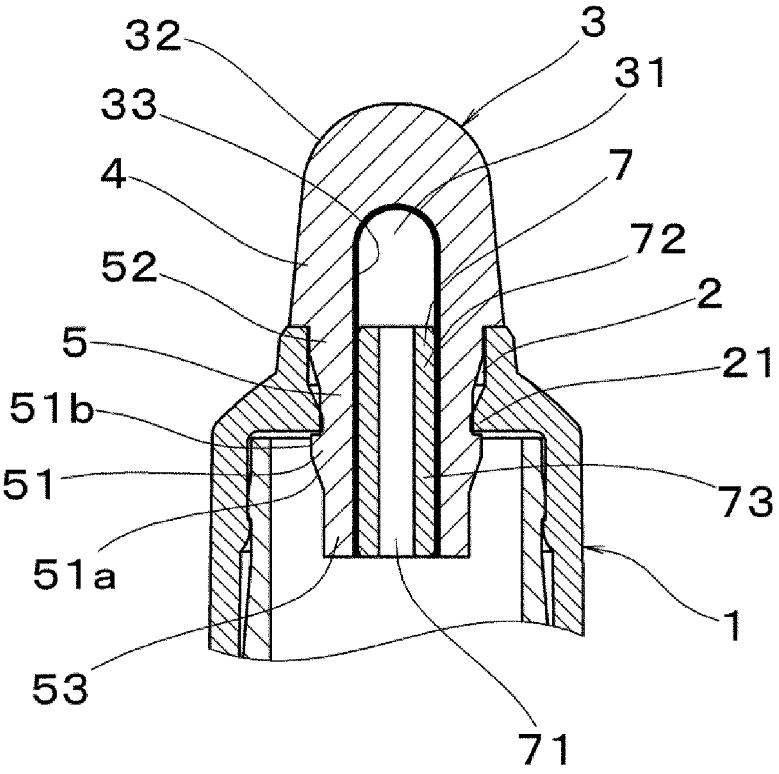
FIG. 7 is a cross-sectional view illustrating another state where a lubricant is present between the internal hole of the soft member and the inner core in FIG. 5.

As illustrated in FIGS. 6 and 7, a lubricant may be configured between the outer circumferential surface of the inner core 7 and the inner circumferential surface of the internal hole 31. In FIGS. 6 and 7, a thick line between the inner core 7 and the internal hole 31 illustrates a lubricant adhered portion 74. The lubricant reduces the pressing force for inserting the inner core 7 into the internal hole 31 of the soft member 3 to allow the inner core 7 to be readily inserted into the internal hole 31.

For example, as illustrated in FIG. 6, the lubricant is applied on the outer circumferential surface of the inner core 7 before the inner core 7 is inserted into the internal hole 31. It is possible to adhere the lubricant to the internal hole 31 by applying the lubricant only on the inner core 7, causing reduction in the steps for attaching the soft member 3. In addition, the lubricant is not adhered to the large diameter portion 4 as the friction portion 32, and thus the lubricant is not adhered to the paper surface by friction operation.

As another example, as illustrated in FIG. 7, the lubricant is applied on the inner circumferential surface of the internal hole 31 before the inner core 7 is inserted into the internal hole 31. The lubricant is adhered neither to the outer circumferential surface of the soft member 3 nor to the outer circumferential surface of the inner core 7, facilitating the handling of these components and allowing smooth attachment of the soft member 3.

Examples of the lubricant allowed to be used include: liquid lubricants, such as silicone-based compounds, fluorine-based compounds, and surfactants; and powder lubricants other than them.

Examples of such a silicone-based compound allowed to be used include silicone oil, silicone gum, and the like. Examples of such a fluorine-based compound allowed to be used include polyvinylidene fluoride, polyvinyl fluoride, and the like. Examples of such a surfactant allowed to be used include anionic, cationic, nonionic, and amphoteric surfactants. It is also possible to use antistatic agents containing them as a main component.

Examples of such a powder lubricant allowed to be used include molybdenum disulfide, polytetrafluoroethylene resins (PTFE), tetrafluoroethylene (TFE), stearyl erucamide, stearamide, erucamide, behenamide, ethylene-bis-stearamide, n-oleyl behenamide, magnesium stearate, calcium stearate, boron nitride, melamine cyanurate, methyl silicone, and the like. These powder lubricants have an advantage of being inert to thermochromic ink and other ink for writing instruments.

8. Position of Inner Core in Internal Hole

Figure 8:
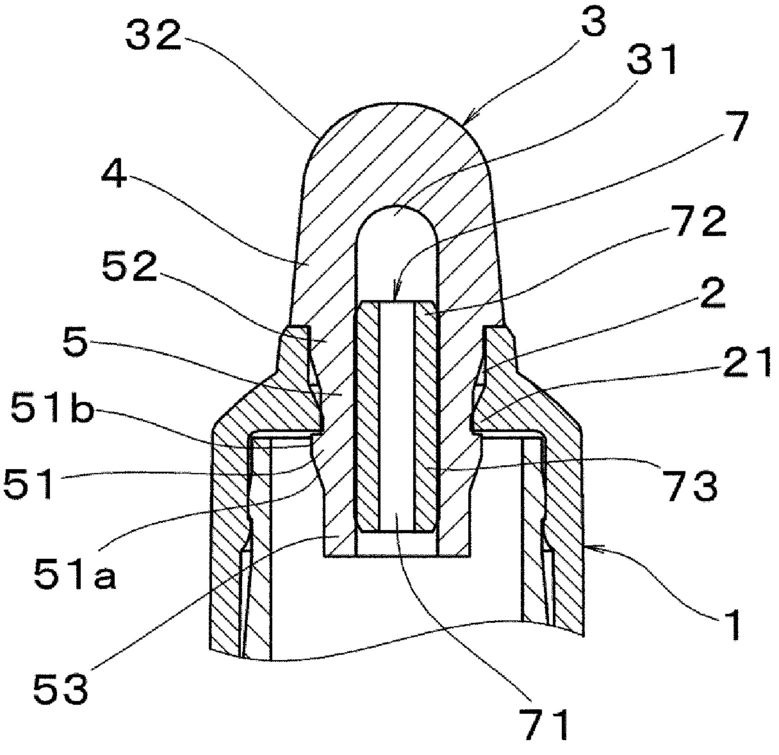
FIG. 8 is a cross-sectional view illustrating a state where an upper end of the inner core in FIG. 5 is inserted into the internal hole to a position beyond an opening at an upper end of the attachment hole.

FIG. 8 illustrates a state where the upper end of the inner core 7 in FIG. 5 described above is inserted into the internal hole 31 to a position beyond the opening at the upper end of the attachment hole 2. From the perspective of firmly fixing the attachment portion 5 of the soft member 3 to the attachment hole 2, the inner core 7 may be in the position at least corresponding to the entire attachment hole 2 and the outward projection 51 of the attachment portion 5. Accordingly, even when the short inner core 7 illustrated in FIG. 5 is inserted into the internal hole 31 to the position illustrated in FIG. 8, there is no disadvantage of weakening the fixation of the attachment portion 5 or damaging the paper surface by the tip end of the inner core 7. Rather, the upper end of the inner core 7 contacting or pressure fitting inside the base portion of the large diameter portion 4 has an advantage of inhibiting deformation of the large diameter portion 4 with the base portion as a fulcrum.

9. Positioning of Inner Core

Figure 9:
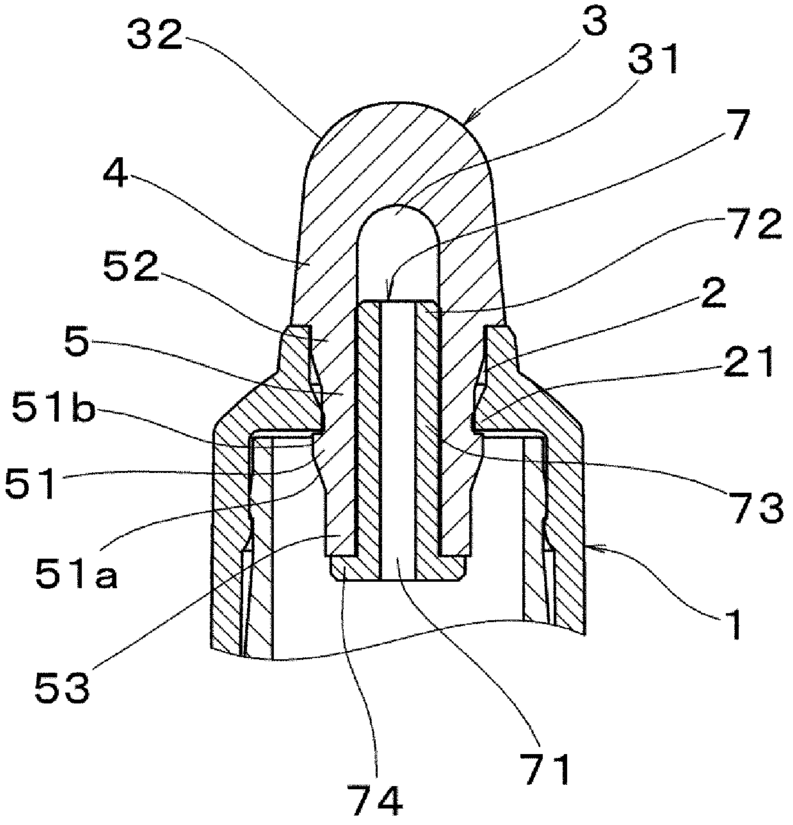
FIG. 9 is a cross-sectional view illustrating a soft-member attachment structure according to an embodiment of the present invention and illustrating a state where an inner core according to the third embodiment is inserted into the internal hole of the soft member in FIG. 3.

To stably settle the position of the inner core 7 inserted into the internal hole 31, a flange portion 74 illustrated in FIG. 9 may be provided at the rear end of the inner core 7. When the inner core 7 is inserted into the internal hole 31, the flange portion 74 abuts on the lower end of the attachment portion 5. The position of the lower end of the inner core 7 thus coincides with the opening at the lower end of the internal hole 31 and the position of the inner core 7 inserted into the internal hole 31 is stably settled. The flange portion 74 thus configured allows the inner core 7 to correspond to the entire attachment hole 2 and the outward projection 51 of the attachment portion 5 and is also capable of settling the position of the tip end of the inner core 7.

10. Thermochromic Writing Instrument

The thermochromic writing instrument widely includes writing instruments to which the thermochromic ink is applicable, such as fountain pens, markers, ball-point pens, mechanical pencils, and pencils.

10.1 Thermochromic Ink

The thermochromic ink is applied to thermochromic writing instruments in the form of either liquid or solid. For example, when the thermochromic writing instrument is a fountain pen, a marker, or a ball-point pen, liquid thermochromic ink is used. Meanwhile, when the thermochromic writing instrument is a mechanical pencil or a pencil, solid thermochromic ink processed in the form of core is used.

The thermochromic ink is provided with a performance of removing or changing color by heating. As a colorant to be blended in the thermochromic ink, it is preferred to use a reversible thermochromic composition containing at least three components, including an electron-donating organic coloring compound, an electron accepting compound, and a reaction medium to determine the induction temperature for the coloration reaction of these compounds. In particular, microcapsule pigments configured to contain the reversible thermochromic composition in microcapsules are effective as the colorant.

The microcapsule pigments have an average particle diameter ranging, for example, from 0.05 μm or more to 5.0 μm or less, preferably from 0.1 μm or more to 4.0 μm or less, and more preferably from 0.5 μm or more to 3.0 μm or less. The microcapsule pigments having an average particle diameter ranging from 0.05 μm or more to 5.0 μm or less achieve good writing performance and handwriting concentration. Moreover, the microcapsule pigments having an average particle diameter of 2.0 μm or more allow the soft member 3 in the present embodiment to chemically erase the thermochromic ink and physically erase the metallic luster pigments.

The average particle diameter of the microcapsule pigments described above is the value of the average particle diameter of the volume equivalent particles measured using image analyzing particle size distribution measurement software "Mac-View" produced by Mountech Co., Ltd. It should be noted that, when most of the particles have a particle diameter of more than 0.2 μm, the value of the average particle diameter of the volume equivalent particles may be measured using a device under the trade name of "Multisizer 4e" manufactured by Beckman Coulter K. K.

10.2 Metallic Luster Pigments

In the thermochromic ink in the present embodiment, metallic luster pigments are blended in addition to the microcapsule pigments described above. The metallic luster pigments add metallic luster to the ink color. The metallic luster pigments preferably have an average particle diameter of 10 μm or more. The metallic luster pigments having an average particle diameter of 10 μm or more achieve highly lustrous handwriting and better physical erasure with the soft member 3.

As an example of the metallic luster pigments, transparent metallic luster pigments are preferred. The transparent metallic luster pigments are visually sensed as fully erased when the microcapsule pigments undergo a thermochromic change to be colorless. Examples of the transparent metallic luster pigments include: luster pigments having a material selected from natural mica, synthetic mica, flat glass pieces, thin aluminum oxide flakes, and the like as a core material and coating the core material with metal oxide; cholesteric liquid crystal luster pigments; and the like.

The luster pigments having natural mica as a core material preferably has a surface coated with titanium oxide or preferably has the surface coating of the titanium oxide layer overcoated with iron oxide or non-thermochromic pigments. For example, it is possible to use pigments under the trade name of "Iriodin" produced by Merck KGaA. and pigments under the trade name of "Lumina Colors" produced by Engelhard Corp.

The luster pigments having synthetic mica as a core material preferably has a surface coated with metal oxide, such as titanium oxide. For example, it is possible to use oxide of metals, such as titanium, zirconium, chromium, vanadium, and iron, and in particular, metal oxide containing titanium oxide as a main component is preferred. For example, it is possible to use pigments under the trade name of "ULTIMICA" produced by Nihon Koken Kogyo Co., Ltd.

The luster pigments having flat glass pieces as a core material preferably has a surface coated with metal oxide, such as titanium oxide. For example, it is possible to use pigments under the trade name of "METASHINE" produced by Nippon Sheet Glass Co., Ltd.

The luster pigments having thin aluminum oxide flakes as a core material may have a surface coated with metal oxide, such as titanium oxide. Examples of the metal oxide allowed to be used include oxide of metals, such as titanium, zirconium, chromium, vanadium, and iron, and in particular, metal oxide containing titanium oxide as a main component is preferred. For example, it is possible to use pigments under the trade name of "Xirallic" produced by Merck Ltd.

The liquid crystal polymer used as the cholesteric liquid crystal luster pigments has properties, due to the interference effect of light, to reflect light in some spectrum range and transmit all the light in the other spectrum ranges. The cholesteric liquid crystal luster pigments have excellent metallic luster, color flop properties to change the hue depending on the visual angle, and transparency. Examples of the cholesteric liquid crystal luster pigments allowed to be used include pigments under the trade name of "Helicone HC" produced by Wacker Chemie AG.

As a lustrous material produced by vacuum depositing metal, such as gold and silver, on a film and then separating the foil to be finely ground, it is possible to use, for example, pigments under the trade name of "ELgee neo" produced by Oike & Co., Ltd.

The metallic luster pigments have an average particle diameter ranging from 0.1 μm or more to 50 μm or less, preferably from 2 μm or more to 40 μm or less, and more preferably from 10 μm or more to 40 μm or less. The metallic luster pigments having an average particle diameter ranging from 0.1 μm or more to 50 μm or less achieve good writing performance and lustrous handwriting. The average particle diameter of the metallic luster pigments is obtained by, for example, measuring a particle diameter distribution using a laser diffraction/scattering particle size distribution analyzer "LA-300" manufactured by HORIBA, Ltd. and calculating a volume-based average particle diameter (median diameter) based on the distribution value.

11. Action and Effects

The structure for attaching the soft member 3 described above is configured to insert the inner core 7 into the internal hole 31, thereby improving the rigidity of the softened friction portion 32 (large diameter portion 4) and inhibiting deformation of the friction portion 32 to allow the friction portion 32 to exhibit good friction performance. In addition, the structure is capable of firmly fixing the attachment portion 5 of the soft member 3 by the forces in the directions inside and outside and the attachment of the soft member 3 does not have to be operated with a large force. Moreover, even when the softened friction portion 32 is worn, the paper surface is not damaged. In addition, the structure is capable of chemically and physically erasing the handwriting in the thermochromic ink in which the metallic luster pigments are blended using the softened friction portion 32.

12. Others

The soft-member attachment structure of the present invention is not limited to the embodiments described above. For example, the area to attach the soft member 3 is not limited to the rear end portion of the barrel 1 configuring the thermochromic writing instrument. For example, the soft-member attachment structure of the present invention allows the soft member 3 to be attached to the apex of a cap configuring the thermochromic writing instrument.

Each inner core 7 in the present embodiments has a length from the opening at the lower end of the internal hole 31 to a position reaching the opening at the upper end of the attachment hole. The length of the inner core 7 is not limited to the length in the embodiments described above. The inner core 7 may have a length from the opening at the lower end of the internal hole 31 to a position not reaching the opening at the upper end of the attachment hole. The inner core 7 may have a length at least corresponding to the inner circumferential surface of the attachment hole 2.

The outward projection 51 of the attachment portion 5 and the inward projection 21 of the attachment hole 2 are not the essential components of the soft-member attachment structure of the present invention. For example, the outer circumferential surface of the attachment portion 5 and the inner circumferential surface of the attachment hole 2 may be circumferential surfaces each having a single diameter.

The "soft member" in the present invention is not limited to the friction portion of the thermochromic writing instrument. The "soft member" includes, for example, an eraser attached to a mechanical pencil, an input section attached to a stylus pen used for input on a touch screen, and the like. In other words, the soft-member attachment structure of the present invention is capable of firmly fixing a flexible eraser, a flexible input section, and the like and the attachment of them does not have to be operated with a large force.

DESCRIPTION OF REFERENCE NUMERALS

1 Barrel
2 Attachment Hole
21 Inward Projection
21*a* Guide Surface
21*b* Minimum Inner Diameter Portion
3 Soft Member
31 Internal Hole
32 Friction Portion

4 Large Diameter Portion
41 Annular Surface
5 Attachment Portion (Small Diameter Portion)
51 Outward Projection
51*a* Guide Surface
51*b* Maximum Outer Diameter Portion
52 Bulged Portion
53 Cylindrical Portion
6 Annular Space
7 Inner Core
71 Vent Portion
72 Upper Core Portion
73 Lower Core Portion
74 Lubricant Adhered Portion
A Length from Upper End of Attachment Portion to Upper End of Outward Projection
B Length from Upper End of Attachment Hole to Lower End of Inward Projection
C Clearance between Inward Projection and Outward Projection

The invention claimed is:

1. A soft-member attachment structure for attaching a soft member to a thermochromic writing instrument, the soft member being used to cause thermochromic ink adhered to a paper surface to undergo a thermochromic change by frictional heat, the soft-member attachment structure comprising:

the soft member;

an attachment hole provided through a rear end portion of a barrel or an apex of a cap, the barrel and the cap configuring the thermochromic writing instrument, along a longitudinal central axis and having an inner circumferential surface between two openings located at an upper end and a lower end;

an attachment portion located under a large diameter portion of the soft member used for a thermochromic change and having a diameter being smaller than a diameter of the large diameter portion and allowing insertion into the attachment hole;

a straight internal hole provided along a longitudinal central axis of the soft member and opening at least at a lower end of the soft member; and a rod-like inner core having an outer diameter allowing insertion into the internal hole, a length to be placed within the internal hole, and an outer circumferential surface contacting an inner circumferential surface of the internal hole, wherein the attachment portion is inserted into the attachment hole and the inner core is inserted into the internal hole to configure the soft member to be attached to the attachment hole wherein in a process of inserting the inner core into the internal hole where the internal hole is a hole with one closed end opening at the lower end of the soft member and not opening at an upper end of the soft member, the inner core is provided with a vent portion to discharge air in the internal hole.

2. The soft-member attachment structure according to claim 1, wherein the attachment portion is integrally formed under the large diameter portion as a single piece using a material same as that of the soft member, the internal hole is provided with a length from the attachment portion to a position reaching the large diameter portion in the soft member, and, in a state where the attachment portion is inserted into the attachment hole and the inner core is inserted into the internal hole, the inner core is held in a position corresponding to the inner circumferential surface of the attachment hole to configure the attachment portion to be sandwiched between the outer circumferential surface of the inner core and the inner circumferential surface of the attachment hole.

3. The soft-member attachment structure according to claim 2, wherein, when a lower end of the inner core is provided with a flange portion having a diameter greater than an inner diameter of the internal hole and the inner core is inserted into the internal hole, the flange portion abuts on a lower end of the attachment portion.

4. The soft-member attachment structure according to claim 2, wherein:

an inward projection projecting inside the attachment hole is formed on the inner circumferential surface of the attachment hole, an outward projection projecting outside the attachment portion is formed on an outer circumferential surface of the attachment portion, when the attachment portion is inserted into the attachment hole, the outward projection rides over the inward projection to lock the outward projection and the inward projection to each other, and the inner core is held in a position corresponding to the inner circumferential surface of the attachment hole to sandwich the attachment portion between the outer circumferential surface of the inner core and the inward projection of the attachment hole.

5. The soft-member attachment structure according to claim 2, wherein, in a state where the attachment portion is inserted into the attachment hole and the inner core is inserted into the internal hole, the inner core has a length from an opening at a lower end of the internal hole to beyond the opening at the upper end of the attachment hole.

6. The soft-member attachment structure according to claim 2, wherein, in a state where the attachment portion is inserted into the attachment hole and the inner core is inserted into the internal hole, the inner core has a length from an opening at a lower end of the internal hole to the opening at the upper end of the attachment hole.

7. The soft-member attachment structure according to claim 6, wherein, in a state where the attachment portion is inserted into the attachment hole and the inner core is inserted into the internal hole, an upper end of the inner core is inserted into the internal hole to a position beyond the opening at the upper end of the attachment hole.

8. The soft-member attachment structure according to claim 2, wherein, in a state where the attachment portion is inserted into the attachment hole and the inner core is inserted into the internal hole, the inner core has a length from an opening at a lower end of the internal hole to a position not reaching the opening at the upper end of the attachment hole.

9. The soft-member attachment structure according to claim 8, wherein, in a state where the attachment portion is inserted into the attachment hole and the inner core is inserted into the internal hole, an upper end of the inner core is inserted into the internal hole to a position beyond the opening at the upper end of the attachment hole.

10. A thermochromic writing instrument comprising the soft-member attachment structure according to claim 9, wherein the soft member is attached to the rear end portion of the barrel or the apex of the cap by the soft-member attachment structure.

11. The soft-member attachment structure according to claim 2, wherein, in a state where the inner core has a maximum outer diameter identical to or greater than an inner diameter of the internal hole and the inner core is inserted into the internal hole, the outer circumferential surface of the inner core and the inner circumferential surface of the internal hole pressure fit each other.

12. The soft-member attachment structure according to claim 11, wherein a lubricant is present between the outer circumferential surface of the inner core and the inner circumferential surface of the internal hole.

13. The soft-member attachment structure according to claim 1, wherein the vent portion is a through hole penetrating the inner core from an end to another end along a longitudinal central axis of the inner core.

14. The soft-member attachment structure according to claim 1, wherein the vent portion is at least one groove or projection continuing from an end to another end of the inner core along the outer circumferential surface of the inner core.

15. A thermochromic writing instrument comprising the soft-member attachment structure according to claim 1, wherein the soft member is attached to the rear end portion of the barrel or the apex of the cap by the soft-member attachment structure.

* * * * *